No. 747,838. PATENTED DEC. 22, 1903.
M. M. ARCHERD.
COOKER.
APPLICATION FILED MAY 5, 1902.
NO MODEL.
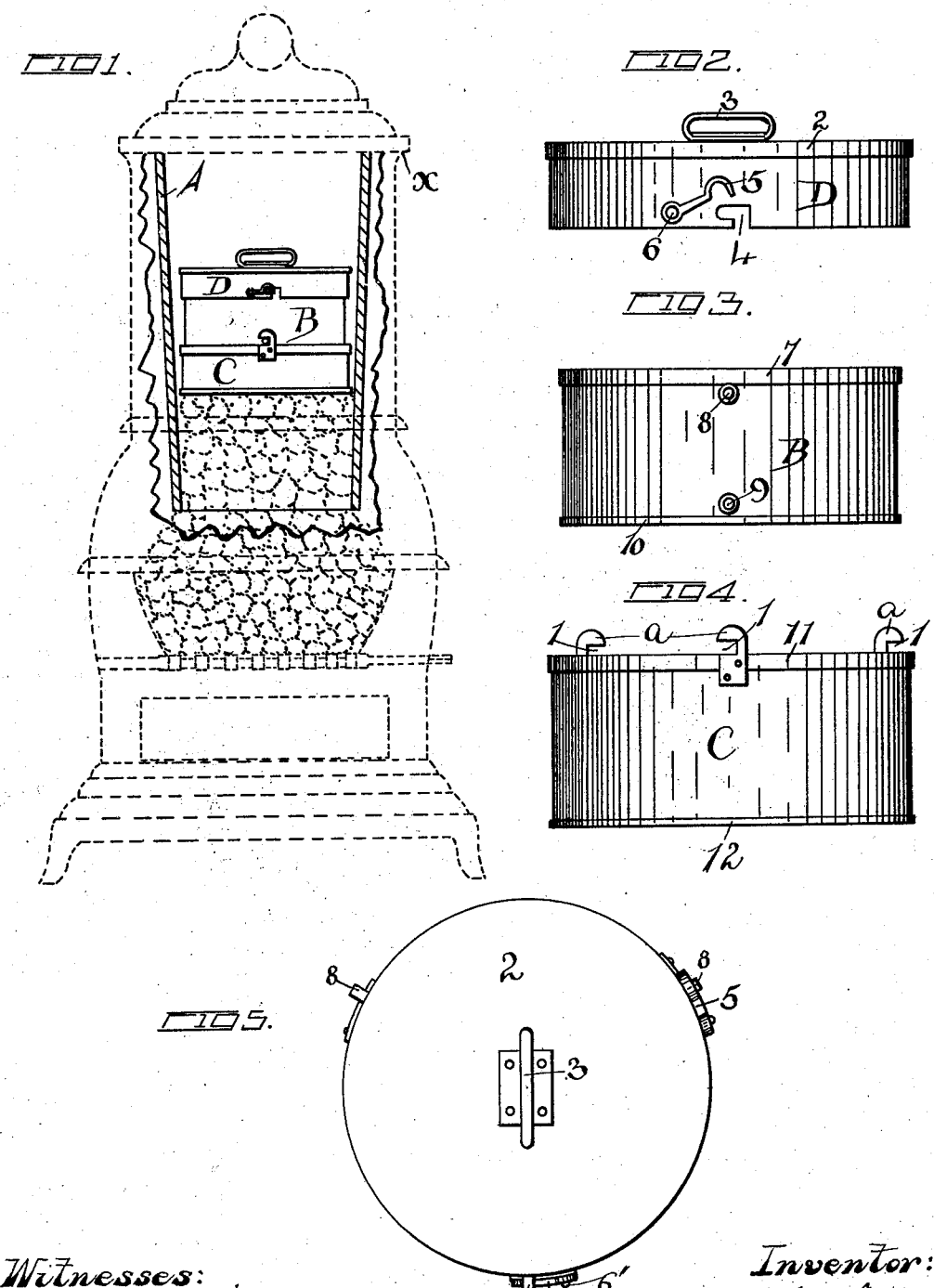

No. 747,838.

Patented December 22, 1903.

UNITED STATES PATENT OFFICE.

MAGGIE MAY ARCHERD, OF WYMORE, NEBRASKA.

COOKER.

SPECIFICATION forming part of Letters Patent No. 747,838, dated December 22, 1903.

Application filed May 5, 1902. Serial No. 105,979. (No model.)

*To all whom it may concern:*

Be it known that I, MAGGIE MAY ARCHERD, residing at Wymore, in the county of Gage and State of Nebraska, have invented certain useful Improvements in Cookers; and I do hereby declare that the following is a full, clear, and exact description of the invention, such as will enable others skilled in the art to which it appertains to make and use the same, reference being had to the accompanying drawings, which form a part of this specification.

This invention relates to a novel cooker.

The aim of my invention is to provide a cooking-receptacle adapted to be used in connection with that class of heating-stoves known as "self-feeding base-burners," and in which a central coal receptacle or magazine is used which empties above the grate, so that the magazine may be partially or wholly filled with fuel, which gradually feeds down as the fuel is consumed. In this class of stoves it is found that there is a great deal of heat contained in this central receptacle or magazine adapted to hold the fuel, and the aim of my invention is to provide a cooking utensil adapted to be placed within the magazines of these hard-coal burning self-feeding heating-stoves, so as to utilize this class of stoves both as a heating and cooking stove without in any way detracting from the appearance or utility of the stove as a heater, while with my invention foods may be cooked within the magazine and in such a manner that all odors escaping from the same are consumed within the magazine, as will be described more fully hereinafter and finally pointed out in the claim.

In the accompanying drawings I have shown in Figure 1 the dotted outline of a self-feeding base-burning stove, disclosing a sectional view of the magazine with one of my cooking-receptacles in position. Fig. 2 shows the lid of my receptacle. Fig. 3 shows a side view of the first cooker or receptacle. Fig. 4 shows a side view of the lower cooker or receptacle, while Fig. 5 shows a top view of the lid.

In a great many homes where the families are small it is quite an expense in winter to maintain a kitchen-fire in order to cook the food the members of a small family require.
As the so-called "hard-coal-burning self-feeding base-heaters" are almost universally used in the homes of a certain class of people, I propose providing a cooker which can be used in cooking two or more articles within the magazine of a self-feeder in sufficient quantities for small families.

In carrying out the aim of my invention I construct a receptacle C, as is shown in Fig. 4, preferably cylindrical, so as to easily fit into the magazine A of any of the so-called "self-feeding" stoves, and this receptacle is preferably made of thin so-called "Russia iron" and is provided with the bottom 12 and the recurved upper edge 11, as is shown in Fig. 4. To the lowermost receptacle are secured a number of ears $a$, provided with the slots 1. In connection with this lower receptacle C, I use a second receptacle B, preferably a little smaller in diameter than the lowermost receptacle and provided with the bottom 10, this receptacle also being of thin sheet metal and being provided below at three points with the projecting rivets 9, which rivets are adapted to work into the slots 1 of the ears $a$. The receptacle B is prevented from dropping into the receptacle C by means of the three laterally-extending rivets O, so that after this receptacle B is placed into the receptacle C it is turned a little in one direction, so that the rivets 9 come within the slots 1 to detachably secure these two receptacles.

The receptacle B is further provided with three projecting rivets 8, and also has its upper edge recurved, as shown at 7. Working upon this receptacle B is a lid D, provided with three so-called "bayonet-slots" 4, this lid working outside of the receptacle B in such a manner that when the lid D is secured to the receptacle B this lid may be held fast by means of a hook 5, held by a pin 6, this hook locking over one of the rivets 8. The receptacle B is also provided with a similar hook 5', held by means of a pin 6' to work over the pin 9. In Fig. 5 this hook 5' is shown. The lid D is provided with a suitable handle E. In using this receptacle the fuel within the stove is allowed to empty downward a sufficient distance so that the closed receptacle may be readily inserted into the magazine. The meat and potatoes, for instance, are placed within the lower receptacle C and the vegetables within the upper receptacle B, which receptacle may for convenience sake be divided into three compartments, as indicated in dotted lines in Fig. 5, so that a small quantity of three different vegetables may be boiled within the receptacle B.

The food may be roasted or boiled, as the receptacles can be used as pots or pans, and it is found that all objectionable odors, as from boiling cabbage, for instance, will be consumed by the heat within the magazine A, while the food cooked will be free of any taint of gas or smoke.

With a little practice the operator can nicely regulate the time required for the various articles to be cooked, and I find it of advantage to place the foods needing the most heat within the lowermost receptacle C. The cooker may be readily removed by means of a poker or a hook adapted to grasp the handle 3 and raised out of the magazine. If it is found that the articles of food within the uppermost receptacle B are sufficiently cooked, the receptacle B is removed from the receptacle C and the lid D is then placed upon the receptacle C, which may again be replaced into the magazine for further cooking.

I find that certain cereals may be placed within a suitable amount of water within these receptacles at night and placed within the magazine and in the morning in time for breakfast in removing this receptacle the breakfast foods will be found properly cooked and ready to be used, so that the coal within the base-burner has been used both for heating and cooking purposes. It will be noticed that by this means there may be effected a considerable saving of fuel, which is of course an item of no small importance to a certain class of coal users. I find that the best results are obtained in using but two receptacles, as B and C, though where the stoves are very large three or more receptacles may be used. While I have described these receptacles as being preferably of a cylindrical conformation, they may be of any suitable shape and of any suitable material, and

Having thus described my said invention, what I claim as new, and desire to secure by United States Letters Patent, is—

The combination with the magazine of a base-burning stove, of a cylindrical cooking-receptacle, comprising a lower receptacle, provided with three projecting ears, an upper receptacle, the bottom of said upper receptacle forming the lid for said bottom receptacle, pins projecting from the lower edge of said upper receptacle, said pins being adapted to work into aforesaid ears, additional pins projecting from the upper edge of said upper receptacle, and a lid adapted to be secured to said upper receptacle, said receptacles, when united, being adapted to fit into the magazine of a base-burning stove, as and for the purpose set forth.

In testimony whereof I affix my signature in presence of two witnesses.

MAGGIE MAY ARCHERD.

Witnesses:
TONY HIRMON,
C. B. HENKLEY.